US009650964B2

(12) United States Patent
Huang et al.

(10) Patent No.: US 9,650,964 B2
(45) Date of Patent: May 16, 2017

(54) ACCESSORY GEARBOX WITH A STARTER/GENERATOR

(75) Inventors: Hao Huang, Troy, OH (US); Jan Zywot, Centerville, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1138 days.

(21) Appl. No.: 12/979,579

(22) Filed: Dec. 28, 2010

(65) Prior Publication Data

US 2012/0159964 A1    Jun. 28, 2012

(51) Int. Cl.
*F02C 7/26* (2006.01)
*F02C 7/32* (2006.01)
*F02C 7/275* (2006.01)

(52) U.S. Cl.
CPC ............... *F02C 7/26* (2013.01); *F02C 7/275* (2013.01); *F02C 7/32* (2013.01); *Y02T 50/671* (2013.01)

(58) Field of Classification Search
CPC .... F02C 7/26; F02C 7/277; F02C 7/32; F02C 7/36; F02C 7/04; F02C 7/27; F02C 3/20; F02C 7/268; F02C 7/275; F02K 9/95; F01D 15/10; F01D 9/00; F01D 9/02; F01D 9/16; H02K 7/1823; F05B 2220/706; F23G 5/46; F05D 2260/311; F05D 2260/33
USPC ........... 60/39.09, 786, 802, 801, 39.01, 788; 310/75 R; 74/6; 290/52
See application file for complete search history.

(56) References Cited

U.S. PATENT DOCUMENTS

| | | | |
|---|---|---|---|
| 3,577,002 A | | 5/1971 | Hall et al. |
| 3,675,444 A | | 7/1972 | Whipple |
| 3,714,779 A | | 2/1973 | Stein et al. |
| 3,889,789 A | | 6/1975 | Boehringer |
| 3,973,412 A | | 8/1976 | Miles |
| 4,271,947 A | * | 6/1981 | Gaeckle ............... 192/82 T |
| 4,281,942 A | | 8/1981 | Gaeckle et al. |
| 4,473,752 A | | 9/1984 | Cronin |
| 4,525,995 A | | 7/1985 | Clark |
| 4,724,331 A | | 2/1988 | Nordlund |
| 4,797,590 A | | 1/1989 | Raad et al. |
| 4,871,296 A | * | 10/1989 | Laessle et al. ............ 415/123 |
| 4,990,807 A | | 2/1991 | Flygare et al. |
| 5,023,537 A | | 6/1991 | Baits |

(Continued)

FOREIGN PATENT DOCUMENTS

| | | |
|---|---|---|
| CN | 2032202 U | 2/1989 |
| CN | 101389841 A | 3/2009 |

(Continued)

OTHER PUBLICATIONS

Unofficial English Translation of Chinese Office Action issued in connection with corresponding CN Application No. 201110462031.5 on Nov. 27, 2014.

(Continued)

*Primary Examiner* — Andrew Nguyen
(74) *Attorney, Agent, or Firm* — GE Global Patent Operation; William S. Munnerlyn

(57) ABSTRACT

An assembly for a gas turbine engine comprising an accessory gearbox comprising a drive gear and pinion gear and a starter/generator mechanically mounted to the accessory gearbox. The starter/generator comprising a housing and a portion of a rotatable shaft with a safety disconnect where the safety disconnect is located within the housing of the starter/generator.

13 Claims, 4 Drawing Sheets

(56) References Cited

U.S. PATENT DOCUMENTS

| | | | |
|---|---|---|---|
| 5,068,590 | A | 11/1991 | Glennon et al. |
| 5,191,254 | A | 3/1993 | Raad et al. |
| 5,267,433 | A | 12/1993 | Burch |
| 5,309,708 | A | 5/1994 | Stewart, Jr. et al. |
| 5,555,722 | A | 9/1996 | Mehr-Ayin et al. |
| 5,587,647 | A | 12/1996 | Bansal et al. |
| 6,058,791 | A | 5/2000 | Brunet |
| 6,204,577 | B1 | 3/2001 | Chottiner et al. |
| 6,364,772 | B1 * | 4/2002 | Sugden .................. 464/31 |
| 6,619,454 | B2 * | 9/2003 | Hayward ................ 192/40 |
| 6,820,531 | B1 * | 11/2004 | Cianciolo ......... F16M 11/12 89/41.02 |
| 6,838,778 | B1 | 1/2005 | Kandil et al. |
| 7,131,275 | B2 | 11/2006 | Gustafson |
| 7,351,174 | B2 | 4/2008 | Beutin et al. |
| 7,495,361 | B2 | 2/2009 | Brouillet et al. |
| 7,656,054 | B2 | 2/2010 | Lardellier |
| 8,432,079 | B2 * | 4/2013 | Lemmers, Jr. ...... H02K 7/116 310/100 |
| 2004/0106486 | A1 | 6/2004 | Jonsson |
| 2006/0056958 | A1 * | 3/2006 | Gaines et al. ............ 415/115 |
| 2006/0087123 | A1 | 4/2006 | Stout et al. |
| 2006/0248865 | A1 | 11/2006 | Latulipe et al. |
| 2007/0000746 | A1 * | 1/2007 | Guyader .................. 192/55.1 |
| 2007/0029804 | A1 | 2/2007 | Nelson |
| 2007/0234739 | A1 * | 10/2007 | Delaloye et al. ........... 60/786 |
| 2008/0053257 | A1 * | 3/2008 | Dusserre-Telmon ..... F02C 7/32 74/11 |
| 2008/0072568 | A1 * | 3/2008 | Moniz et al. ................ 60/226.1 |
| 2008/0238098 | A1 * | 10/2008 | Becquerelle et al. ........ 290/3 |
| 2009/0104019 | A1 | 4/2009 | MacFarlane et al. |
| 2009/0199567 | A1 * | 8/2009 | Gockel et al. ................ 60/788 |
| 2009/0232640 | A1 * | 9/2009 | Deperrois et al. ......... 415/122.1 |
| 2009/0309461 | A1 | 12/2009 | Berenger et al. |
| 2010/0192594 | A1 * | 8/2010 | Le Saint .................... 60/787 |
| 2010/0300117 | A1 | 12/2010 | Moulebhar |
| 2012/0118103 | A1 | 5/2012 | Blewett et al. |

FOREIGN PATENT DOCUMENTS

| | | |
|---|---|---|
| EP | 0540192 A1 | 5/1993 |
| EP | 1397584 A1 | 3/2004 |
| GB | 839961 A | 6/1960 |
| JP | 4845543 U | 6/1973 |
| JP | 5397256 U | 8/1978 |
| WO | 2005073540 A1 | 8/2005 |
| WO | 2007096493 A1 | 8/2007 |

OTHER PUBLICATIONS

US Non-Final Office Action issued in connection with related U.S. Appl. No. 12/163,441 on Jun. 27, 2013.

US Final Office Action issued in connection with related U.S. Appl. No. 12/763,441 on Nov. 6, 2013.

Unofficial English Translation of Chinese Office Action issued in connection with related Application No. 201110107905.5 on Apr. 1, 2014.

Unofficial English Translation of Japanese Office Action issued in connection with corresponding Application No. 2011280739 on Feb. 9, 2016.

CA office action issued Jan. 20, 2017 in connection to related CA Application 2736795.

Hao Huang et al., U.S. Appl. No. 12/763,441, filed Apr. 20, 2010.

* cited by examiner

ACCESSORY GEARBOX WITH A STARTER/GENERATOR

BACKGROUND OF THE INVENTION

Gas turbine engines, also known as combustion turbine engines are rotary engines that extract energy from a flow of combusted gases passing through the engine onto a multitude of turbine blades. Gas turbine engines have been used for land and nautical locomotion and power generation, but are most commonly used for aeronautical applications such as for airplanes and helicopters, where they primarily are used for propulsion.

Gas turbine engines usually power a number of different accessories such as generators, starter/generators, permanent magnet alternators (PMA) and/or permanent magnet generators (PMG), fuel pumps, and hydraulic pumps. All these accessories provide for functions needed on the aircraft other than propelling the aircraft. For example, when the gas turbine engine is running the starter generator (S/G) produces electrical power and when the gas turbine needs to be started the S/G serves as a starting motor when provided energy from another energy source.

BRIEF DESCRIPTION OF THE INVENTION

One embodiment of the invention relates to an assembly for a gas turbine engine comprising an accessory gearbox (AGB) and a starter generator (S/G). The AGB has an AGB housing defining an interior, a first shaft portion mounted for rotation within the interior of the AGB housing, a pinion gear mounted to the first shaft portion for co-rotation, and a drive gear located within the AGB housing and enmeshed with the pinion gear. The S/G has a S/G housing defining an interior, a second shaft portion mounted for rotation within the interior of the S/G housing, and a safety disconnect provided with the second shaft portion, wherein the first and second shaft portions are operably coupled for co-rotation and the safety disconnect is located completely within the S/G housing.

DETAILED DESCRIPTION OF THE INVENTION

The present invention is related to coupling of a starter/generator (S/G) containing more than one component on to an accessory gear box (AGB), also known as a transmission housing. The S/G mounted to the AGB has various applications including starting a gas turbine engine that the AGB is mechanically coupled to and to generate electrical power when the gas turbine engine is in operation.

Figure 1:
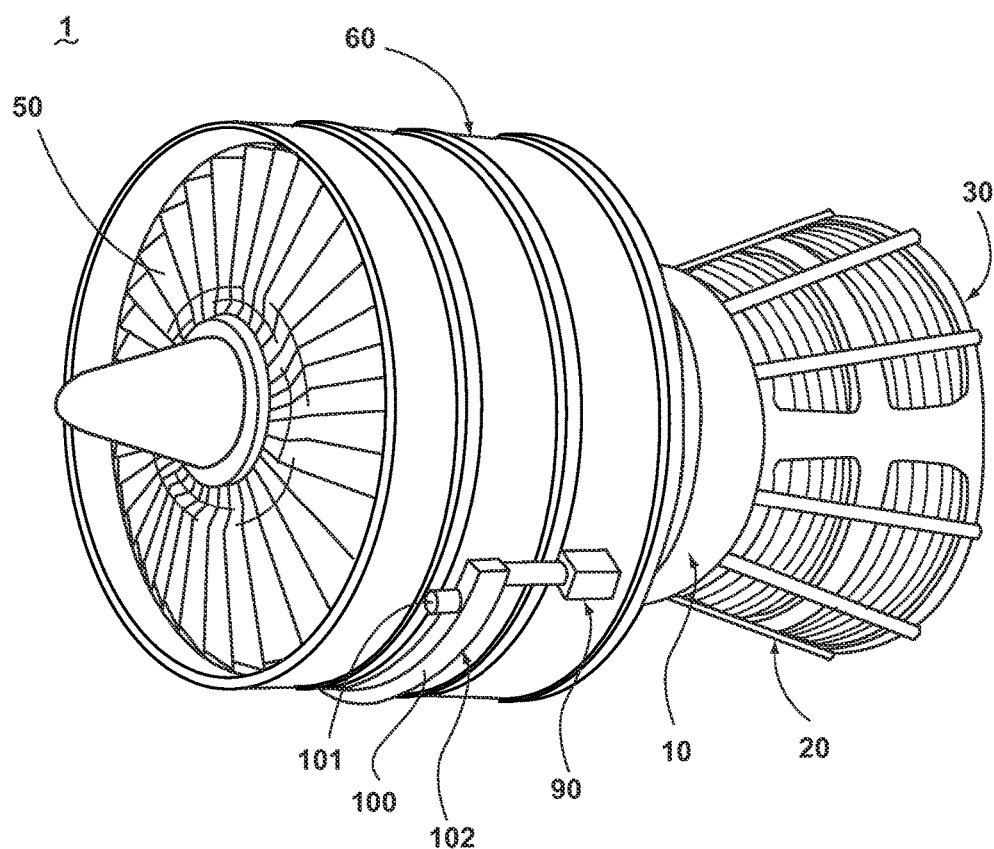
FIG. 1 is a schematic illustration of a gas turbine engine with an accessory gearbox.

Referring to FIG. 1, an assembly 102 comprising the AGB 100 and the S/G 101 is schematically illustrated mounted to the gas turbine engine 1. This assembly is commonly referred to as an Integrated Starter/Generator Gearbox (ISGB). The gas turbine engine 1 comprises an air intake with a fan 50 that supplies air to a high pressure compression region 60. The air intake with a fan 50 and the high pressure compression region collectively are known as the 'cold section' of the gas turbine engine upstream of the combustion. The high pressure compression region 60 provides the combustion chamber 10 with high pressure air. In the combustion chamber, the high pressure air is mixed with fuel and combusted. The hot and pressurized combusted gas passes through a high pressure turbine region 20 and a low pressure turbine region 30 before exhausting from the gas turbine engine. As the pressurized gases pass through the high pressure turbine (not shown) of the high pressure turbine region 20 and the low pressure turbine (not shown) of the low pressure turbine region 30, the turbines extract rotational energy from the flow of the gases passing through the gas turbine engine 1. The high pressure turbine of the high pressure turbine region 20 may be coupled to the compression mechanism (not shown) of the high pressure compression region 60 by way of a shaft to power the compression mechanism. The low pressure turbine may be coupled to the fan 50 of the air intake by way of a shaft to power the fan 50.

The gas turbine engine may be a turbofan engine, such as a General Electric GEnx or CF6 series engine, commonly used in modern commercial and military aviation or it could be a variety of other known gas turbine engines such as a turboprop or turboshaft. The gas turbine engine may also have an afterburner that burns an additional amount of fuel downstream of the low pressure turbine region 30 to increase the velocity of the exhausted gases, and thereby increasing thrust.

The accessory gearbox (AGB) 100 is coupled to a turbine shaft of the gas turbine engine 1, either to the low pressure or high pressure turbine by way of a mechanical power take-off 90. The mechanical power take off contains multiple gears and means for mechanical coupling of the AGB 100 to the gas turbine engine. The assembly 102 may be mounted on the outside of either the air intake region containing the fan 50 or on the core near the high pressure compression region 60.

Figure 2:
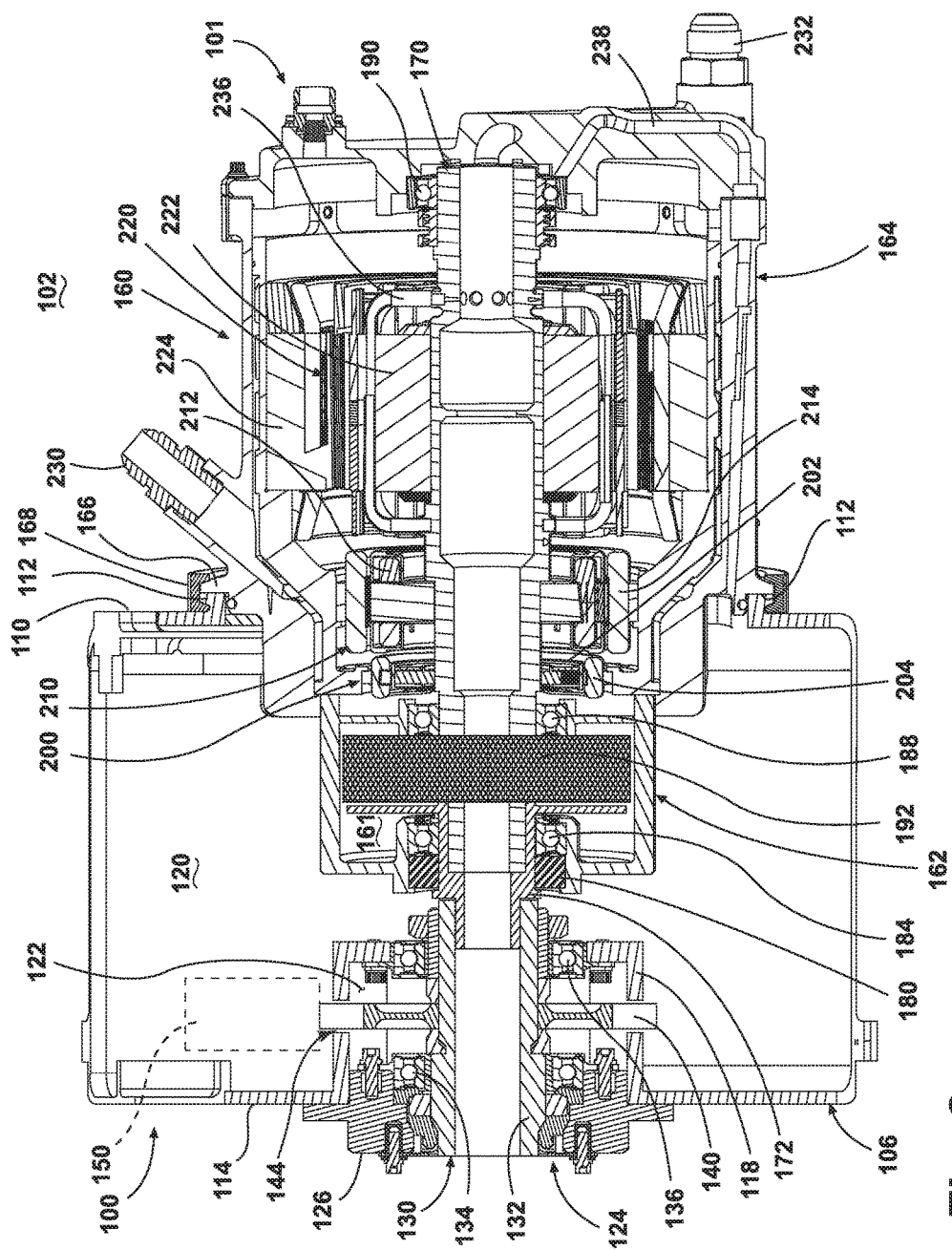
FIG. 2 is a sectional view of the starter/generator mounted to the accessory gearbox according to one embodiment of the invention.

Referring now to FIG. 2, the relationship between the S/G 101 and the AGB 100 is shown in greater detail. The AGB comprises a housing 106 with a front AGB wall 110 and a back AGB wall 114 with an AGB interior 120 enclosed therebetween. The back wall 114 of the AGB housing 106 can further comprise an inset cavity 122 with sidewall 118 to accommodate a pinion gear assembly 124 therein. The pinion gear assembly 124 comprises a pinion gear assembly housing 126, a first shaft portion 132 rotatably mounted to the pinion gear assembly housing 126 and supported by a first spaced bearing 134 and a second spaced bearing 136. A pinion gear 140 is carried by the first shaft portion 132 for co-rotation and located between the first spaced bearing 134 and the second spaced bearing 136. There is an aperture 144 in the inset sidewall 118 through which the pinion gear 140 extends and meshes with a drive gear 150 (shown schematically as a dotted rectangle for clarity) driven by a gear train (not shown) coupled to the power take-off 90 of the gas turbine engine 1. The pinion gear 140 can be more proximate to the back AGB wall 114 than the front AGB wall 110.

The AGB interior 120 can also contain oil to provide lubrication and cooling to mechanical parts contained therein such as the pinion gear 140, the drive gear 150, and the first and second spaced bearings 134 and 136.

The front wall 110 of the AGB housing further has an opening with an AGB clamping interface 112 at the periphery of the opening to align with an S/G clamping interface 166 on an S/G housing 160 that can be clamped together with clamp 168 to mount the S/G 101 to the AGB 100. When the S/G 101 with S/G housing 160 defining an S/G interior 161 is mounted to the AGB 100, a first S/G housing portion 162 is disposed within the AGB interior 120 and a second S/G housing portion 164 is disposed outside of the AGB interior 120.

The S/G 101 comprises a second shaft portion 170 extending from the S/G interior 161 supported by a third spaced bearings 184, a fourth spaced bearings 188, and a fifth spaced bearings 190. The second shaft portion 170 and the first shaft portion 132 are coupled together with shaft interface portion 172 to form a single rotatable shaft 130. The shaft interface portion 172 may be by any known method of coupling including, but not limited to, gears, splines, a clutch mechanism, or combinations thereof. An example of a shaft interface portion 172 is disclosed in U.S. Pat. No. 4,281,942 to General Electric and is incorporated herein by reference in its entirety.

The second shaft portion 170 carries multiple machines within the S/G interior 161 such as a main machine 220, an exciter 210, and a PMG 200, with the corresponding rotating component comprising a main machine rotor 222, an exciter rotor 212, and a PMG rotor 202, respectively, and the corresponding fixed component comprising a main machine stator 224, an exciter stator 214, and a PMG stator 204. The exciter 210 provides direct current to the field windings of the main machine 220. The main machine 220 and PMG 200 supply AC electrical power when the rotatable shaft 130 rotates. The machines 200, 210, and 220 can be carried on second shaft portion 170 between the fourth spaced bearings 188 and the fifth spaced bearings 190. The fixed components 204, 214, and 224 may be mounted to any suitable part of either or both the first S/G housing portion 162 and second S/G housing portion 164.

As illustrated, the S/G 101 is oil cooled, and an oil inlet port 230 and an oil outlet port 232 are provided for controlling the supply of oil to and from the S/G 101. The cooling oil may be used to dissipate heat generated by the electrical and mechanical functions of the S/G 101 by flowing the oil through oil conduits 236 and 238, such that the machines 200, 210, and 220 are not coated with oil and particularly the spaces between the fixed components 204, 214, and 224 and rotating components 202, 212, and 222 are not filled with oil. Therefore, the oil that is used to cool the machines within the S/G interior 161 does not freely flow outside of designated conduits 236 and 238.

The S/G 101 further comprises an oil seal 180 that surrounds the second shaft portion 170 and is surrounded by the first housing portion 162. The oil seal prevents cooling and lubrication oil from the AGB interior 120 from entering the S/G interior 161 and also prevents any particles and debris from the S/G interior 161 from contaminating the oil in the AGB interior 120. The oil seal 180 can be more proximate to the pinion gear 140 than the safety disconnect 192.

The AGB housing 106 and the S/G housing 160 can be formed by any known materials and methods, including, but not limited to, die-casting of high strength and lightweight metals such as aluminum, stainless steel, iron, or titanium. The housing 106 and 160 may be formed with a thickness sufficient to provide adequate mechanical rigidity without adding unnecessary weight to the assembly 100 and, therefore, the aircraft.

The rotatable shaft 130 comprising the first shaft portion 132 and second shaft portion 170 can be constructed by any known materials and methods, including, but not limited to extrusion or machining of high strength metal alloys such as those containing aluminum, iron, nickel, chromium, titanium, tungsten, vanadium, or molybdenum. The diameter of the second shaft portion 170 may be fixed or vary along the length of the rotatable shaft 170. The diameter may vary to accommodate different sizes, as well as rotor to stator spacings of the various machines 200, 210, and 220.

All of the machines 200, 210, and 220 are placed on the same side of the pinion gear 140 and the exciter 210 and the PMG 200 are placed closer to the pinion gear 140 than the main machine 220. The machines 200, 210, and 220 may be any combination of known motors and generators. For example, the main machine 220 could be either a synchronous or asynchronous generator. In addition to the machines shown in this embodiment, there may be other components that may need to be operated for particular applications. For example, in addition to the electromechanical machines 200, 210, 220 shown, there may be other machines driven from the same rotatable shaft 130 such as an oil pump, a fluid compressor, or a hydraulic pump.

As illustrated, the PMG 200 with the PMG rotor 202 and PMG stator 204 is closest to the pinion gear 140 and the exciter 210 with the exciter rotor 212 and exciter stator 214 is between the PMG 200 and the main machine 220. Alternatively, the exciter 210 with the exciter rotor 212 and exciter stator 214 can be closest to the pinion gear 140 and the PMG 200 with the PMG rotor 202 and PMG stator 204 is between the exciter 210 and the main machine 220.

A safety disconnect 192 may be disposed on the second shaft portion 170 between the third spaced bearings 184 and fourth spaced bearings 188 provided to mechanically decouple the machines 200, 210, and 220 from the pinion gear 140 and, thereby, the drive gear 150 and the AGB 100 in the case of mechanical or thermal failure of any of the machines 200, 210, 220. The safety disconnect 192 can be more proximate to the pinion gear 140 than any of the machines 200, 210, and 220.

The safety disconnect 192 can be any known safety disconnect mechanism including, but not limited to, a resettable mechanical disconnect, a sheared shaft disconnect, a thermal disconnect, or combinations thereof. The safety disconnect 192 serves as a weakened point on the second shaft portion 170 and provides a controlled region for failure of the second shaft portion 170 if there is a mechanical or thermal failure of any of the machines 200, 210, and 220 or bearings 184, 188, 190 in the interior of the S/G during operation.

As an example, the safety disconnect 192 can be a thermal disconnect where a low melting temperature material can be used to construct the safety disconnect 192 portion of the second shaft portion 170. The low melting temperature material can be a solder-like material containing tin, lead, indium, copper, silver, or combinations thereof. During operation, if one or more of the machines 200, 210, and 220 overheat transferring thermal energy to the shaft 130, at some point the low melting point material of the safety disconnect 192 on the shaft 130 melts or partially melts and, thereby, mechanically severs the machines 200, 210, and 220 from the first shaft portion 132, the pinion gear 140, and the drive ear 150. As a result, the safety disconnect 192 serves as a mechanism for mechanically separating the machines 200, 210, and 220 upon failure so that the failure localizes damage to the S/G 101 and not to the AGB 100 or the gas turbine engine 1. The exact mechanism for the safety disconnect 192 does not detract from the embodiments disclosed herein. U.S. Pat. No. 6,364,772 to Hamilton Sundstrand Corporation and U.S. Pat. No. 3,675,444 to General Electric Company disclose safety disconnect mechanisms and are incorporated herein by reference in their entirety.

In general, during a mechanical or thermal failure resulting in disconnection of the shaft 130 at the safety disconnect 192, there are particles and debris generated by the destruction of the safety disconnect 192. It is desirable to prevent these particles and debris from contaminating the cooling and lubrication oil in the AGB interior 120.

A benefit of the assembly 102 is that it provides for a low moment of the shaft 130 while it provides for containment of any debris generated by disconnection of the shaft 130 at the safety disconnect 192. This moment, commonly referred to as the overhung moment, is approximately equal to the distance between the pinion gear 140 to the center of mass of the assembly 102 multiplied by the weight of the assembly. The location of the exciter 200 and PMG 210 more proximate to the pinion gear 140 than the main machine 220 has the effect of moving the center of mass of the assembly closer to the pinion gear 140 and, thereby, reduces the moment from the various accessories carried by the shaft 130 and which act on the pinion gear 140 and its mating with the drive gear 150. The relative locations of the machines 200, 210, and 220 may enable partial nesting of the S/G 101 within the AGB 100 to reduce the distance between the pinion gear 140 to the center of mass of the assembly 102. The relative locations of the machines 200, 210, and 220 may also reduce the overall weight of the assembly 102 which also has the effect of reducing the moment.

The value of these benefits become more clear when one understands and appreciates the spatial limitations of the S/G 101 in a gas turbine engine 1 environment, in which physical space is at a premium and reduced physical size ultimately means less aerodynamic drag the thrust must overcome and less weight an airplane must carry. The spatial restrictions and power requirements tend to push design of the main machine toward lower pole counts, in that it reduces the overall weight and size of the S/G 101 and the overall assembly 102. However, lower pole counts require faster rotational speeds of the shaft 130 to achieve desired power output. Additionally, since soft materials such as silicon-iron alloys are commonly used in the machines, low pole counts help reduce excessive core losses that result from high frequency magnetic field switching. High frequency switching of the magnetic field may also generate a high level of heat that is difficult to remove from the assembly 102. In one embodiment, the main machine may have a pole count as low as two. As a result of using low pole count motors and generators, an assembly configuration 102 that minimizes the overhung moment of the assembly 102 and maximizes the rotational speed of the rotatable shaft 130 is desired to maximize power output. The relative locations of the PMG 210, exciter 200, and main machine 220 has an influence on the maximum critical rotational speed of the rotatable shaft 130 and the overhung moment of the assembly 102 of the S/G 101 mounted upon the AGB 100.

To maximize the rotational speed of the rotatable shaft 130, the span of length between the first spaced bearings 134 and the fifth spaced bearings 190 should be minimized. With the relative locations of the machines 200, 210, and 220 as shown where both the PMG 210 and the exciter 200 are more proximate to the pinion gear 140 than the main machine 220 and by placing all of the machines on the same side of the pinion gear 140, rather than splitting the accessories into two parts on either side of the pinion gear 140 the distance between the first spaced bearings 134 and the fifth spaced bearings 190 can be reduced and therefore the rotational velocity of the shaft 130 can be improved. A greater rotational velocity of the shaft 130, in turn, produces a greater power output from low pole count generators. By using low pole count generators, the overall weight of the assembly 102 is reduced.

Additionally, by placing all the machines 200, 210, and 220 on the same side of the pinion gear 140, only a single safety disconnect 192 is required and can be placed within the interior of the S/G 161, rather than outside of the S/G housing 160. As a result, if the rotatable shaft 130 is severed at the safety disconnect the resulting particles and debris can be contained within the S/G housing 160 and does not contaminate the cooling and lubrication oil in the AGB interior 120. Therefore, with the assembly 100 configuration disclosed, a reduced overhung moment resulting in greater shaft 130 rotational speeds and reduced assembly 102 weight is achieved while preventing particulates and debris resulting from failure of any of the machines 200, 210, 220 and the subsequent severing of the shaft 130 at the safety disconnect 192.

Figure 3:
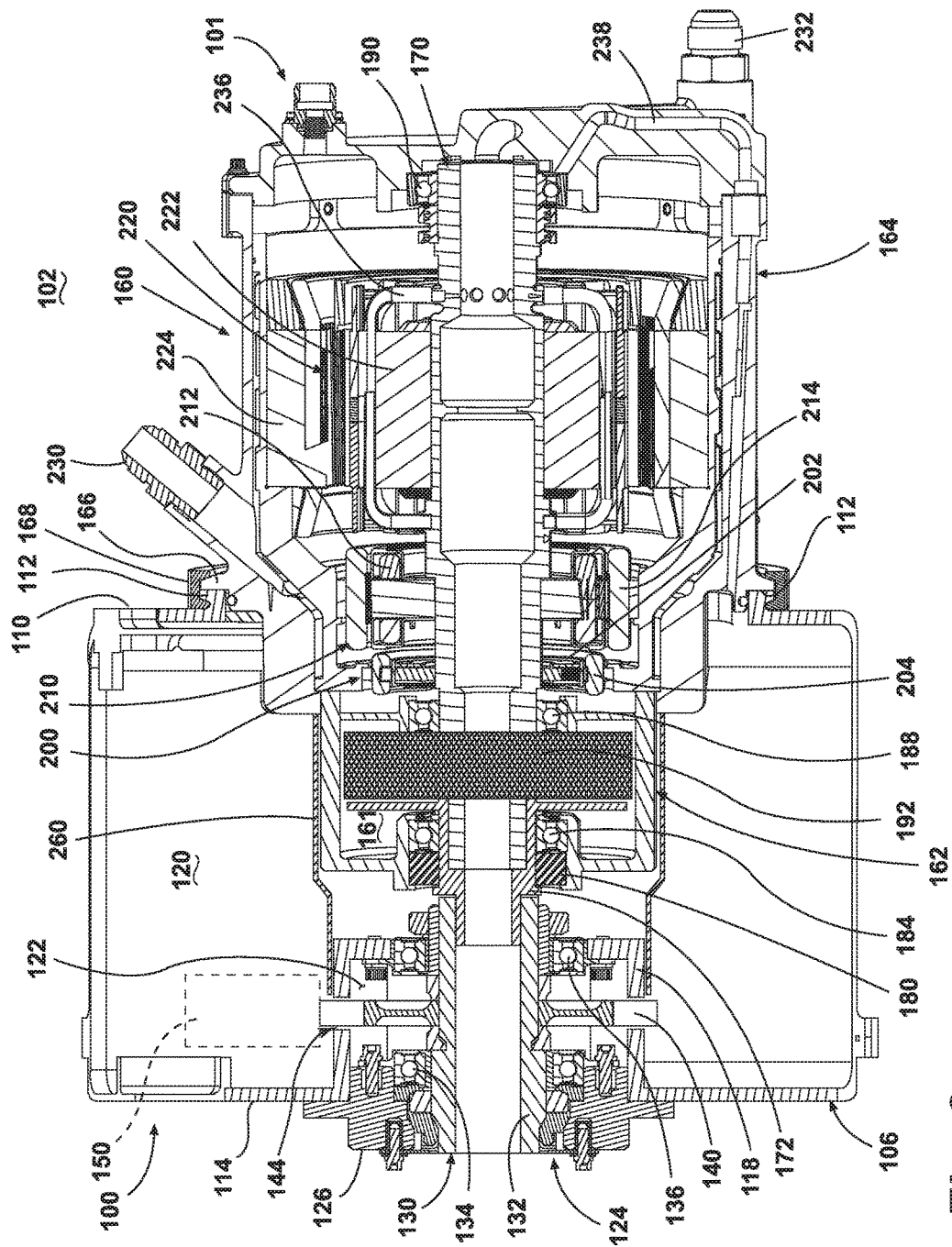
FIG. 3 is a sectional view of the starter/generator mounted to the accessory gearbox with a protective shroud around the starter/generator according to another embodiment of the invention.

Referring now to FIG. 3, another embodiment of the previous assembly 102 is illustrated that is substantially identical to the assembly shown in FIG. 2, with the exception of a shroud surrounding the interface between the S/G 101 and the AGB 100. In particular, the region between the S/G housing 160 and the inset sidewall 118 is surrounded by the shroud 260. The shroud is not weight bearing and, therefore, can neither provide mechanical rigidity the S/G 101 to AGB mount nor support the rotatable shaft 130. The purpose of the shroud 260 is to catch any particulates or debris that escapes from the S/G interior 161 and prevent the contamination of the oil inside of the AGB 100. The shroud 260 may be particularly useful in case of the shaft 130 severing at the safety disconnect 192, in which case a large amount of particles and debris will be generated and there is a resulting possibility of particles from the S/G interior 161 coming through the oil seal 180.

Figure 4:
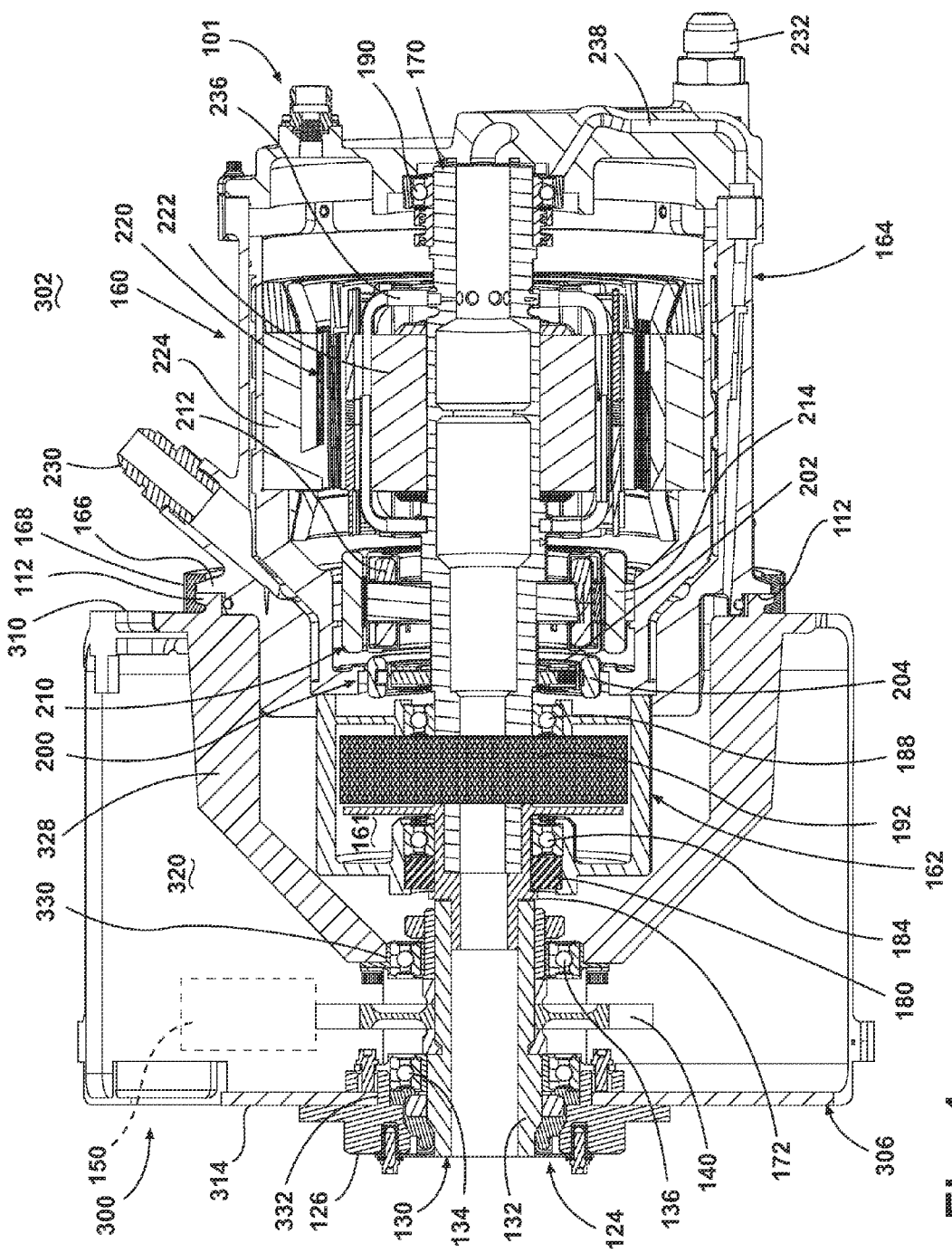
FIG. 4 is a sectional view of the starter/generator mounted to a weight bearing wall of the accessory gearbox according to yet another embodiment of the invention.

Another embodiment of the AGB and S/G assembly 302 is shown in FIG. 4 and is substantially identical to the assembly shown in FIG. 2, except for variations to the AGB 300. Therefore, the parts of the AGB 300 that differ from the first embodiment will be described with numerals having a 300 series. The primary difference between the AGB 300 and 100 is the weight bearing inset wall 328 of the AGB 300 surrounding the interface between the S/G 101 and the AGB 300. The inset wall 328 protrudes inwardly from AGB front wall 310 of the AGB housing 306 and has an aperture defined by aperture sidewall 330 within which is held the second spaced bearing 136 for rotatably supporting the first shaft portion 132. Instead of an inset sidewall 118 protruding inward into the AGB interior 120 from the AGB back wall 314 as in FIG. 2, in this assembly 302, there is an AGB back aperture defined by an AGB back aperture sidewall 332 within which the pinion gear assembly 124 is held. The pinion gear assembly 124, therefore, does not have an inset sidewall surrounding it and instead provides rotatable support of the first shaft portion 132 on one side of the pinion gear 140 and the inset wall 328 provides support on the other side of the pinion gear 140. This assembly 302 arrangement may provide additional protection against debris and particles from the S/G interior 161 contaminating the AGB interior 320 and the cooling and lubricating oil therein than the assembly 102 of FIG. 2. In other words, the inset wall serves as a shroud that is also weight bearing and provides a mechanical function of supporting the pinion gear 140 and the first shaft portion 132.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An assembly for a gas turbine engine comprising: an accessory gearbox (AGB) comprising:
   an AGB housing defining a first interior and comprising a sidewall;
   a first shaft portion mounted for rotation within the first interior of the AGB housing;
   a first bearing mounted between the sidewall and the first shaft portion;
   a pinion gear extending through the sidewall and mounted to the first shaft portion for co-rotation; and
   a drive gear located within the AGB housing and enmeshed with the pinion gear;
   a starter generator (S/G) comprising:
   a S/G housing defining a second interior fluidly isolated from the first interior; and
   a second shaft portion mounted for rotation within the second interior of the S/G housing;
   a second bearing mounted between the S/G housing and the second shaft portion; and
   a safety disconnect configured for predetermined failure and located within the S/G housing and disposed on the second shaft portion;
   wherein the first and second shaft portions are operably coupled for co-rotation by the safety disconnect which is located completely within the S/G housing such that upon failure of the safety disconnect, the second shaft portion has a controlled failure at the safety disconnect, and any debris from the failure of the safety disconnect and second shaft portion is contained within the S/G housing;
   a shroud covering an interface between the S/G and the AGB and extending between the sidewall and the S/G housing, wherein the shroud arrests particles or debris escaping from the S/G housing.

2. The assembly of claim 1 further comprising a main machine, a permanent magnet generator (PMG), and an exciter carried by the second shaft portion.

3. The assembly of claim 2 wherein the main machine, the PMG, and the exciter are located within the S/G housing.

4. The assembly of claim 3 wherein one of the PMG and the exciter are located on the second shaft portion in between the pinion gear and the main machine.

5. The assembly of claim 2 wherein the safety disconnect is in between the pinion gear and at least one of the PMG, the exciter, or the main machine.

6. The assembly of claim 1 wherein the S/G further comprises an oil seal surrounding the second shaft portion and the oil seal is in between the pinion gear and the safety disconnect.

7. The assembly of claim 1 wherein the S/G housing comprises a first S/G housing portion and a second S/G housing portion, wherein the first S/G housing portion is disposed within the AGB first interior and the second S/G housing portion is disposed outside of the AGB first interior when the S/G is mounted to the AGB.

8. The assembly of claim 7 wherein the S/G further comprises a main machine, a permanent magnet generator (PMG), and an exciter carried by the second shaft portion, wherein at least one of the exciter and the PMG is surrounded by the first S/G housing portion.

9. The assembly of claim 1 wherein the shroud comprises a weight bearing wall surrounding the first S/G housing portion and rotatably supporting the first shaft portion.

10. The assembly of claim 9 wherein the AGB further comprises a pinion gear housing located within the first interior of the AGB in opposing relationship to the weight bearing wall, with the first shaft portion being rotatably supported by the pinion gear housing and the weight bearing wall.

11. The assembly of claim 1 wherein the AGB housing comprises a front and back wall, and the S/G is mounted to the front wall of the AGB housing and the pinion gear is more proximate to the back wall of the AGB housing than the front wall of the AGB housing.

12. The assembly of claim 1 further comprising a mechanical coupling operably connecting the first and second shaft portions for co-rotation.

13. The assembly of claim 1 wherein the safety disconnect is one of a resettable mechanical disconnect, a sheared shaft disconnect, or a thermal disconnect.

* * * * *